Figure 1:
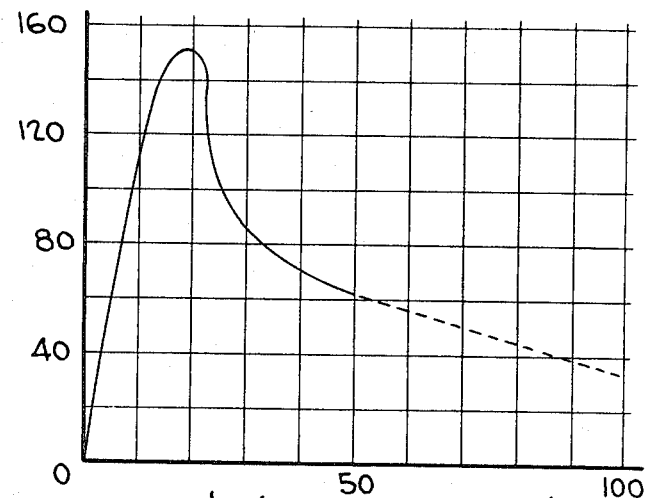

United States Patent [15] 3,650,838
Giner et al. [45] Mar. 21, 1972

[54] ELECTROCHEMICAL CELL WITH PLATINUM-RUTHENIUM ELECTRODE AND METHOD OF USING WITH AMMONIA

[72] Inventors: Jose D. Giner, Glastonbury; James R. Moser, Bolton, both of Conn.

[73] Assignee: United Aircraft Corporation, East Hartford, Conn.

[22] Filed: Sept. 30, 1965

[21] Appl. No.: 491,759

[52] U.S. Cl. ................................................136/86, 136/120
[51] Int. Cl. .................................H01m 27/10, H01m 27/30
[58] Field of Search ................136/86 E, 86 D, 120, 120 FC; 75/172 P, 172 A

[56] References Cited

UNITED STATES PATENTS

| | | | |
|---|---|---|---|
| 3,321,334 | 5/1967 | Palmer | 136/86 |
| 3,368,922 | 2/1968 | Salyer | 136/86 |
| 3,382,103 | 5/1968 | Smith | 136/86 |
| 3,431,220 | 3/1969 | Batzold | 252/461 X |
| 2,076,953 | 4/1937 | Lacy | 75/172 UX |
| 2,636,819 | 4/1953 | Streicher | 75/172 |
| 3,275,475 | 9/1966 | Cohn et al. | 136/86 |
| 3,288,653 | 11/1966 | Holt et al. | 136/120 |
| 3,297,489 | 1/1967 | Feng et al. | 136/120 |
| 3,305,402 | 2/1967 | Jones et al. | 136/120 |
| 3,306,780 | 2/1967 | Dieberg | 136/121 |
| 3,309,231 | 3/1967 | Hess | 136/120 |

FOREIGN PATENTS OR APPLICATIONS 951,168 3/1964 Great Britain ..........................136/86

OTHER PUBLICATIONS

Young Fuel Cells–Vol. 2–Reinhold Publ. Co., N.Y. 1963, pp. 153, 155, 156, 160, 161, 162, 164– Article by R. A. Wynveen– Preliminary Appraisal of the Ammonia Fuel Cell System– Chapter 12

W. A. Nemilow et al.– Ueber Legierungen des Platins mit Rhodium, inzeit. Fuer Anorg. V Allge. Chem. Vol. 22 (1935-1936) pp. 185- 189

*Primary Examiner*—Winston A. Douglas
*Assistant Examiner*—M. J. Andrews
*Attorney*—Robert F. Conrad and Alfred W. Breiner

[57] ABSTRACT

An improved method of, and an apparatus for, generating electrical energy is described comprising feeding ammonia to an anode comprising a major amount of platinum and a second metal of the platinum group in minor but effective amounts. Preferred percentages range from about 75 to 98 parts platinum and from about 25 to about 2 parts of the promoter metal on an atomic weight basis.

3 Claims, 3 Drawing Figures

Patented March 21, 1972

3,650,838

INVENTORS,
JOSÉ D. GINER
JAMES R. MOSER
BY

ELECTROCHEMICAL CELL WITH PLATINUM-RUTHENIUM ELECTRODE AND METHOD OF USING WITH AMMONIA

This invention relates to fuel cells, and more particularly to new and improved catalytic electrodes, and the cells incorporating such electrodes for the electrochemical generation of electricity in which the over-all cell reaction is the electro-oxidation of ammonia.

A "fuel cell," as the term is generally understood in the art, refers to a device which converts chemical energy directly into electrical energy wherein the over-all cell reaction is the oxidation of a fuel by oxygen or suitable oxidizing gas, such as air. The essential components of such a "fuel cell" are two electrodes in contact with the oxygen-containing gas and the fuel, respectively, and an electrolyte. In accordance with generally recognized convention, the oxygen electrode may be considered as the positive electrode and the fuel electrode as the negative electrode with reference to the external circuit. The electrolyte functions to permit transport of ions without direct electrical contact between the fuel and oxidizing gas whereby the oxidation of the fuel can take place only as a result of a directed flow of ions across the electrolyte and a corresponding flow of electrons in an external circuit.

The chemical and physical characteristics of ammonia make it commercially attractive as a fuel because of its low cost and ready liquification. Its liquid state permits ease of transportation, and more critically, the use of low cost equipment for the transportation and storage of the material. Ammonia has the additional property of being readily soluble in an aqueous electrolyte. Therefore, with a high concentration of fuel, diffusion is not likely to cause appreciable polarization at the electrode. Thus, the rate of the electrochemical reaction at the electrode will be the principal limiting factor affecting the current density of the fuel cell. However, heretofore available electrodes employing metals of the platinum group such as platinum, ruthenium, iridium, and the like, have demonstrated only very low catalytic activities in an aqueous electrolyte when fed with ammonia with resultant low current densities being obtained. Such low current densities precluded the use of ammonia as a fuel in a practical cell.

It is, therefore, an object of the present invention to provide an electrode for a moderate temperature fuel cell, for the electro-oxidation of ammonia, which electrode develops remarkably enhanced current densities at low polarization rates.

For further objects and advantages of the invention, for a description of the methods of producing the preferred form of the electrode of the present invention, and for an outline of the ways of practicing the invention, reference is to be had to the following description taken in conjunction with the drawing illustrating test results of electrodes according to the invention.

The present invention is particularly concerned with the production of a fuel cell electrode for the electro-oxidation of ammonia to produce direct current energy, which represents a different order of effectiveness and which provides an unexpectedly low propensity toward polarization of the voltage for a given current output. The electrode of the present invention is designed primarily for use in an improved fuel cell constituted to utilize ammonia as the "fuel" in an aqueous electrolyte, particularly an aqueous alkali metal hydroxide, at moderate temperatures.

More particularly, the fuel cell electrode of the present invention is characterized by the presence of a catalytic alloy consisting essentially of platinum and a second metal of the platinum group, e.g., ruthenium or rhodium, in which the platinum is present in a major amount and the second metal of the platinum group is present in a minor amount. The activity of these electrodes for the electro-oxidation of aqueous ammonia is substantially greater than the activity of either platinum or the second metal of the platinum group taken individually. More specifically, the platinum and second metal of the platinum group are present in an atom ratio of from about 75 to about 98 platinum and from about 25 to about 2 of the second metal of the platinum group. As an example, platinum-ruthenium and platinum-rhodium alloys within the aforesaid range, bonded to a compatible electrode substrate, exhibit enhanced catalytic electrochemical oxidation of ammonia at low rates of polarization of the electrode voltage when in simultaneous contact with an aqueous caustic electrolyte. Although the above ratios are effective, the preferred catalytic alloys consist essentially of platinum and ruthenium in an atom ratio of from about 75 to about 85 platinum and from about 25 to about 15 ruthenium and platinum and rhodium in an atom ratio of from about 92 to about 98 platinum and from 8 to about 2 rhodium, preferably as the black forms.

The catalytic alloys can be formed upon a suitable substrate to provide the electrodes of the present invention by any appropriate method such as vapor deposition, chemical deposition, electro-deposition and the like which provides the requisite electrolyte-catalyst interface for the electrochemical oxidation reaction to proceed at optimum rates. A preferred manner of producing the electrodes of the present invention, however, is the electrodeposition of the black forms of the respective metals from an aqueous solution of a mixture of their soluble salts, e.g., the chlorides thereof, at suitable voltage and current densities to form a stable bond between the catalytic alloy and the substrate. Thus, a suitable substrate can comprise a porous matrix formed by sintering other metal powders, such as copper, nickel, iron, platinum, and the like, thereby forming a porous structure, and thereafter coating at least the surface of the pores which comes in contact with the aqueous electrolyte, with the desired platinum alloy. Furthermore, a porous matrix comprising a porous refractory of ceramic or polymeric material which is then coated with the desired platinum alloy can also be utilized. Accordingly, the substrate can be an electroconductor or non-conductor. Where the electrode substrate itself is not electro-conducting, the thickness of the alloy deposited should be sufficient to conduct current and provide connecting means to the external conducting circuit, or a conductive screen or mesh can be pressed into the catalytic layer. The electrodes can be fabricated as flat, unsupported sheets or they may be formed as a corrugated or tubular structure. The tubular construction is sometimes preferred since the effective surface area of the electrode is increased and is ideal for bi-polar or multi-polar cells. Additionally, a tubular structure will withstand greater pressures.

Electrodes made in accordance with the invention were experimentally evaluated as fuel electrodes for the electrochemical oxidation of ammonia at various temperatures. In order to eliminate uncontrolled variables which conceivably could mask the actual performance obtained from the fuel electrode, a half-cell electrode test unit was employed. The fuel electrode to be tested was opposed by a platinum cathode, both immersed in 5N aqueous KOH electrolyte and an external source of current was supplied to the platinum cathode. This measured current, representing the total electrode current, is then related to the oxidation potential of the fuel electrode in reference to a reversible hydrogen electrode in the same electrolyte which is used as a reference electrode.

As exemplary of the improved results obtainable from the use of electrodes employing the platinum-ruthenium alloys as catalysts, reference is had to FIG. 1. This figure shows the test results at 25° C. of a number of catalytic alloys prepared by electrodeposition of the black forms of the metals onto a platinum substrate from an aqueous solution of their chlorides having a total concentration of platinum plus ruthenium equal to 2 weight percent at ambient temperature (25° – 30° C.) at from about 3 to about 4.5 volts and at a current ranging from about 75 to 125 milliamps per square centimeter. In the term "Activity, $\mu A$/mcoul" of FIG. 1, "$\mu A$" refers to the ammonia current obtainable at 400 mv positive to a hydrogen electrode in the same solution and "mcoul" refers to the quantity of electricity necessary to form a monolayer of hydrogen on the surface of the catalyst, i.e., a factor describing the quantity of available surface. As the atom ratio of ruthenium-platinum in the plating solution increases, the activity of the deposited alloy increases rapidly, reaching a maximum at a composition of approximately 20± 5/80± 5 ruthenium-platinum in the plating solution. Alloys deposited from plating solutions having an atom ratio of ruthenium to platinum of from about 5/95 through 50/50 demonstrate a significant enhancement of the catalytic activity. Alloys deposited from plating solutions having an atom ratio of ruthenium to platinum of from about 10/90 to about 25/75 have greatly enhanced catalytic activity.

Figure 2:
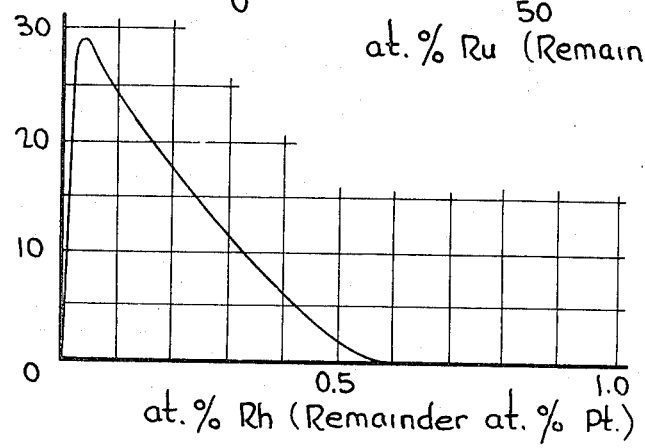

As exemplary of the improved results obtainable from the use of electrodes employing the platinum-rhodium alloys as catalyst, reference is had to FIG. 2 showing test results at 25° C. of catalytic alloys prepared by electrodeposition of the black forms of the metals on a platinum substrate as described hereinbefore in reference to platinum-ruthenium alloys. As the atomic percent rhodium in the plating solution increases, the activity of the deposited alloy initially increases rapidly, reaching an optimum when the atom ratio of rhodium-platinum is near 5/95 (i.e., 5±3 rhodium and 95±3 platinum) in the plating solution. Substantial activity is demonstrated by alloys deposited from plating solutions having an atom ratio of rhodium-platinum of from about 2/98 to 25/75.

Figure 3:
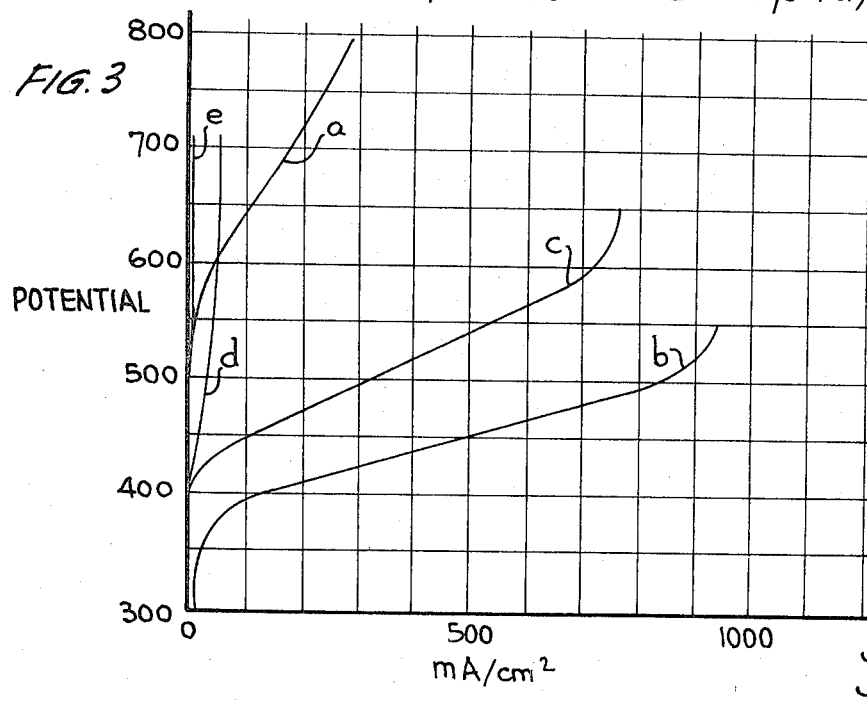

Additional experimental data indicative of the improved performance of the electrodes tested are set forth in the potential vs. current curves of FIG. 3. The tests were carried out at 45° C. in 5 molar KOH with the electrolyte being saturated with ammonia. In the potentiostatic experiment, the $iR$ loss is eliminated. The composition of the electrodes in atomic percent is as follows:

| Curve | Composition of Deposit (atom %) | | |
|---|---|---|---|
| (a) | Pt 98.9 | | Pb 1.1 |
| (b) | Pt 83.7 | Ru 15.4 | Pb 0.9 |
| (c) | Pt 93.8 | Rh 5.3 | Pb 0.9 |
| (d) | | Ru 99 | Pb 1.0 |
| (e) | | Rh 99 | Pb 1.0 |

From the curves, it is seen that the performance of the alloys of platinum and ruthenium, and platinum and rhodium are greatly superior to the pure platinum, pure ruthenium, and pure rhodium electrodes. The superiority is primarily in lower polarization values and greater limiting current densities.

The electrodes described herein can be employed in the generation of electrical current by the electro-oxidation of ammonia in substantially any of the prior art methods of feeding the reactants. Thus, the ammonia can be brought into solution with the electrolyte and thereafter into contact with the electrode, or it can be fed directly to the electrode in the gaseous or liquid state. Moreover, the electrolyte, while preferably being an alkali metal hydroxide, can be virtually any of the known prior art electrolytes. It is only necessary that the electrolyte remain substantially invariant and have high ionic conductivity at the reaction conditions of the fuel cell. Therefore, other alkaline electrolytes such as the carbonates and the alkanolamines can be employed. Further, although it is indicated that the operating temperature of the cell is preferably below 100° C., it is, of course, possible to operate the cell at higher temperatures. Thus, fuel cells employing the electrodes of this invention will function satisfactorily without loss of integrity at temperatures as high as 450° to 500° C. Further, although the presently described electrodes are primarily designed for use in conjunction with ammonia as the fuel, they do possess enhanced properties for other fuels including hydrogen, carbon monoxide, methane, methanol, propane, and the like. The most outstanding results, however, are realized in the electro-oxidation of ammonia.

In the fuel cells utilizing the electrodes of the present invention, any of the prior art cathodes can be employed such as the lithiated nickel oxide structures as described in Bacon, U.S. Pat. No. 2,716,670. In these fuel cells, the ancillary hardware is not of major importance. It is only necessary that the fuel cell comprise the anode of the present invention, a cathode as described in the prior art, with an electrolyte therebetween, and means for feeding the fuel and oxidant to the respective electrodes. The spacial arrangement of the components of the cell are not critical. However, it is usually desirable to have the cell as compact as possible in order to utilize as little space as possible. Additionally, the electrodes should be closely spaced in order that the ohmic resistance across the electrolyte is as small as possible. As will be apparent to one skilled in the art, it is possible to make numerous modifications to the invention described without departing from the inventive concept herein disclosed. Such embodiments being within the ability of one skilled in the art are to be embraced by the following claims.

What is claimed is:

1. A fuel cell for the direct generation of electricity from ammonia and oxygen comprising: an oxygen electrode as the cathode; an ammonia electrode as the anode; an electrolyte therebetween; said electrodes being spaced apart and in contact with said electrolyte, said anode comprising a platinum-ruthenium alloy catalyst for promoting the electro-oxidation of ammonia, the atom ratio of platinum to ruthenium in said alloy catalyst being from about 75 to about 85 platinum and from about 25 to about 15 ruthenium; a source of oxygen including means for providing oxygen to said cathode; and a source of ammonia including means for providing ammonia to said anode.

2. A fuel cell according to claim 1 wherein the electrolyte is an aqueous alkali metal hydroxide solution.

3. A method for the direct generation of electricity utilizing a fuel cell which comprises an ammonia anode, an oxygen cathode, and electrolyte therebetween, comprising the steps: bringing ammonia into simultaneous contact with said electrolyte and said anode; said anode comprising a platinum-ruthenium alloy catalyst for promoting the electro-oxidation of ammonia, the atom ratio of platinum to ruthenium in said alloy being from about 75 to about 85 platinum and from about 25 to about 50 ruthenium; simultaneously bring oxygen into contact with said electrolyte and said cathode; and connecting said anode catalyst and said cathode by means of an electrical conducting circuit which receives the generated electricity.

* * * * *